US009576419B2

(12) United States Patent
Carpentier et al.

(10) Patent No.: US 9,576,419 B2
(45) **Date of Patent: *Feb. 21, 2017**

(54) MERCHANDISER

(75) Inventors: Bart Carpentier, Zoersel (BE); Jurgen Roekens, Kampenhout (BE); Joost Dessing, CV Hoofddorp (NL)

(73) Assignee: The Coca-Cola Company, Atlanta, GA (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/076,531

(22) Filed: Mar. 31, 2011

(65) Prior Publication Data

US 2012/0000927 A1 Jan. 5, 2012

Related U.S. Application Data

(63) Continuation-in-part of application No. 12/828,345, filed on Jul. 1, 2010.

(51) Int. Cl.

| | |
|---|---|
| ***B65D 83/00*** | (2006.01) |
| ***A47F 3/04*** | (2006.01) |
| ***B65G 59/00*** | (2006.01) |
| ***G07F 17/00*** | (2006.01) |
| ***G07F 7/06*** | (2006.01) |
| ***G07F 9/10*** | (2006.01) |
| ***G07F 11/04*** | (2006.01) |
| ***G07F 11/08*** | (2006.01) |
| ***G07F 11/10*** | (2006.01) |
| ***G07F 11/26*** | (2006.01) |
| ***G07F 11/42*** | (2006.01) |
| ***G07F 11/52*** | (2006.01) |
| ***G07F 11/58*** | (2006.01) |

(52) U.S. Cl.

CPC ......... *G07F 17/0071* (2013.01); *A47F 3/0491* (2013.01); *G07F 7/0609* (2013.01); *G07F 9/105* (2013.01); *G07F 11/04* (2013.01); *G07F 11/08* (2013.01); *G07F 11/10* (2013.01); *G07F 11/26* (2013.01); *G07F 11/42* (2013.01); *G07F 11/52* (2013.01); *G07F 11/58* (2013.01); *G07F 17/0078* (2013.01); *A47F 3/0486* (2013.01)

(58) Field of Classification Search

CPC ....... F25D 25/027; G07F 7/06; G07F 17/0071
USPC ............... 221/66, 262, 167, 82, 93, 97, 102, 221/150 R, 150 HC, 151; 194/4, 4 C; 62/246

See application file for complete search history.

(56) References Cited

U.S. PATENT DOCUMENTS

| | | | | |
|---|---|---|---|---|
| 882,858 | A | 3/1908 | Alexander et al. | |
| 1,606,679 | A * | 11/1926 | Wagner | 221/97 |
| 1,631,091 | A * | 5/1927 | Frick | 221/66 |
| 1,700,218 | A * | 1/1929 | Eisenstat | 221/66 |

(Continued)

FOREIGN PATENT DOCUMENTS

| | | | |
|---|---|---|---|
| FR | 2626757 | A1 | 1/1989 |
| FR | 2641887 | A1 | 7/1990 |

(Continued)

*Primary Examiner* — Michael K Collins

(57) ABSTRACT

The present application and the resultant patent provide a merchandiser. The merchandiser may include an ambient compartment with at least one ambient product therein, a temperature controlled compartment with at least one temperature controlled product therein, and a rotary internal transport system within the temperature controlled compartment so as to dispense a temperature controlled product in response to an ambient product being placed therein.

19 Claims, 12 Drawing Sheets

(56) References Cited

U.S. PATENT DOCUMENTS

| | | | | |
|---|---|---|---|---|
| 1,711,581 | A * | 5/1929 | Bixler | 221/66 |
| 1,816,455 | A * | 7/1931 | Wingate | F25D 31/007<br>221/311 |
| 1,872,031 | A * | 8/1932 | Baker et al. | 312/36 |
| 2,029,109 | A * | 1/1936 | Kucher | 62/378 |
| 2,254,208 | A * | 9/1941 | Brock | 221/84 |
| 2,260,643 | A | 10/1941 | Rosan | |
| 2,266,025 | A * | 12/1941 | Grau | 221/152 |
| 2,371,845 | A | 3/1945 | Robison | |
| 2,408,444 | A * | 10/1946 | Payne | 221/82 |
| 2,671,001 | A | 3/1954 | Ossanna, Jr. | |
| 3,055,548 | A | 9/1962 | Allegri | |
| 3,294,282 | A | 12/1966 | Brown | |
| 3,501,016 | A * | 3/1970 | Eaton | 211/49.1 |
| 3,533,536 | A * | 10/1970 | Baxendale | A47F 1/087<br>221/281 |
| 4,252,250 | A | 2/1981 | Toth | |
| 4,325,227 | A | 4/1982 | Ibrahim | |
| 4,361,012 | A | 11/1982 | Ibrahim | |
| 4,411,351 | A | 10/1983 | Lowder et al. | |
| 4,478,047 | A | 10/1984 | Ibrahim | |
| 4,615,169 | A | 10/1986 | Wurmli | |
| 4,687,119 | A | 8/1987 | Juillet | |
| 4,823,982 | A * | 4/1989 | Aten et al. | 221/3 |
| 4,919,250 | A | 4/1990 | Olson et al. | |
| 5,048,719 | A | 9/1991 | Empl et al. | |
| 5,201,191 | A | 4/1993 | Bustos | |
| 5,247,798 | A | 9/1993 | Collard, Jr. | |
| 6,073,460 | A | 6/2000 | Credle, Jr. et al. | |
| 6,170,230 | B1 | 1/2001 | Chudy et al. | |
| 6,173,582 | B1 | 1/2001 | Hixson | |
| 6,247,610 | B1 | 6/2001 | Ziesel et al. | |
| 6,286,715 | B1 | 9/2001 | Ziesel et al. | |
| 6,354,098 | B1 * | 3/2002 | Bardin et al. | 62/250 |
| 6,499,627 | B2 | 12/2002 | Arai | |
| 6,625,952 | B1 | 9/2003 | Chudy et al. | |
| 6,801,836 | B2 | 10/2004 | Schanin | |
| 6,808,082 | B2 | 10/2004 | Ohkubo | |
| 7,228,989 | B2 | 6/2007 | Bhatti et al. | |
| 7,581,658 | B2 * | 9/2009 | Mosconi et al. | 221/161 |
| 7,857,148 | B2 * | 12/2010 | Roeske | 211/59.3 |
| 8,113,382 | B1 * | 2/2012 | Piersant et al. | 221/102 |
| 8,161,756 | B2 * | 4/2012 | Kutta et al. | 62/63 |
| 8,261,940 | B2 * | 9/2012 | Pfister | G07F 11/04<br>221/123 |
| 2003/0201275 | A1 | 10/2003 | Tamura | |
| 2004/0026446 | A1 | 2/2004 | Mori et al. | |
| 2004/0140317 | A1 | 7/2004 | Forte | |
| 2006/0028392 | A1 | 2/2006 | Covely | |
| 2006/0261080 | A1 | 11/2006 | Matsumoto et al. | |
| 2008/0011771 | A1 | 1/2008 | Roekens et al. | |
| 2008/0142537 | A1 * | 6/2008 | Howell et al. | 221/112 |
| 2008/0245820 | A1 * | 10/2008 | Pfister | G07F 11/04<br>221/1 |
| 2009/0029016 | A1 * | 1/2009 | Pfister | F25D 11/02<br>426/231 |
| 2010/0024913 | A1 * | 2/2010 | Howard | B65D 1/0223<br>141/1 |
| 2011/0186591 | A1 * | 8/2011 | Pfister | 221/97 |
| 2012/0000744 | A1 * | 1/2012 | Roekens et al. | 194/350 |
| 2012/0000927 | A1 | 1/2012 | Carpentier | |

FOREIGN PATENT DOCUMENTS

| | | | |
|---|---|---|---|
| WO | 00/32477 | A1 | 6/2000 |
| WO | 2004/017266 | A2 | 2/2004 |
| WO | 2004/017268 | A2 | 2/2004 |
| WO | 2006/036153 | A1 | 4/2006 |
| WO | 2008057914 | A2 | 5/2008 |
| WO | 2010/008611 | A2 | 1/2010 |
| WO | 2010/149402 | A1 | 12/2010 |
| WO | 2012/003206 | A2 | 1/2012 |

* cited by examiner

FIG. 16
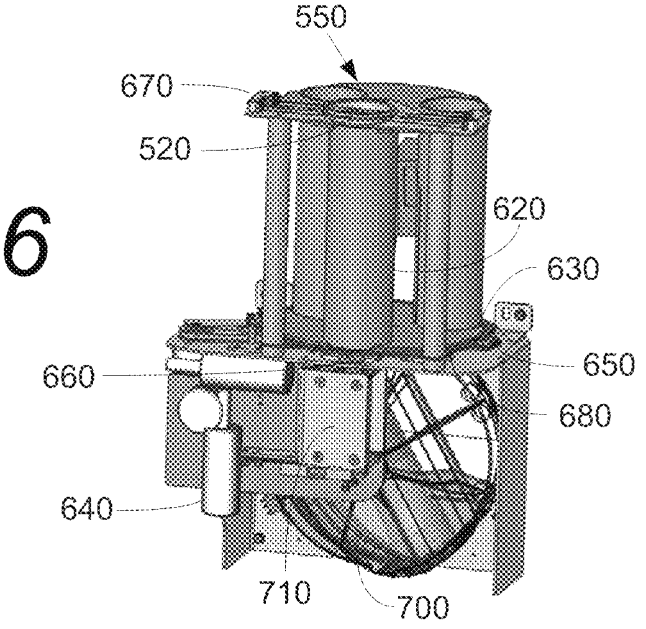
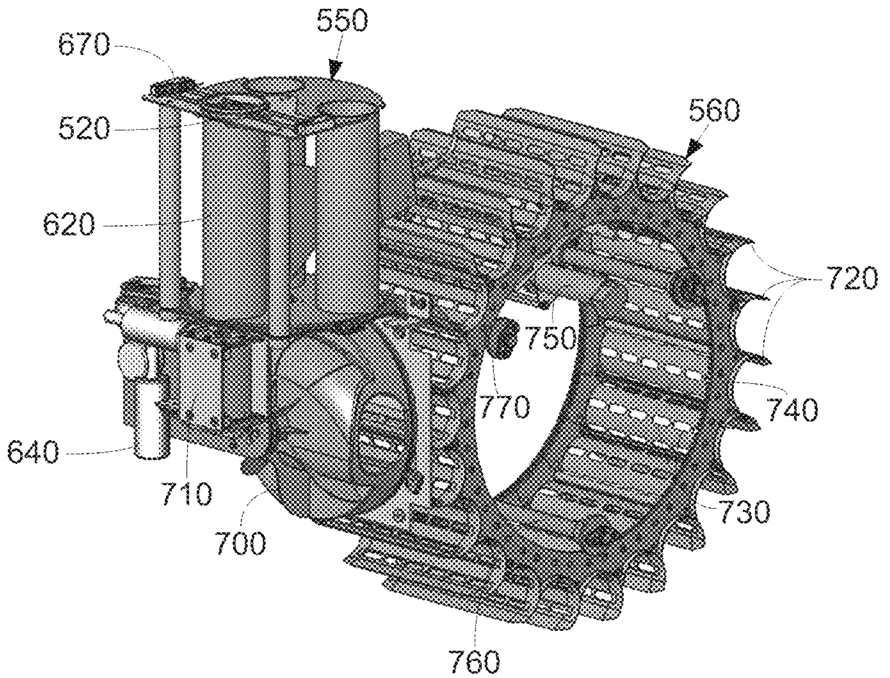
FIG. 17

MERCHANDISER

RELATED APPLICATION

The present application is a continuation-in-part of U.S. Ser. No. 12/828,345, entitled "Merchandiser", filed on Jul. 1, 2010, now pending. U.S. Ser. No. 12/828,345 is incorporated herein by reference in full.

TECHNICAL FIELD

The present application relates generally to merchandisers such as coolers and other types of product dispensers and more particularly relates to a merchandiser with features of an open front cooler and with the increased energy efficiency of a glass door merchandiser.

BACKGROUND OF THE INVENTION

Generally described, an open front cooler includes a refrigerated open enclosure with a number of products therein within the reach of a consumer. Because of this quick and easy accessibility and proximity to the chilled products therein, open front coolers often spur impulse purchases by consumers who prefer chilled products to those at ambient temperatures. As a result, open front coolers generally provide an increased sales volume over conventional glass door merchandisers and the like of the same size and/or in similar locations and/or with products stored at ambient temperatures on shelves.

One drawback with conventional open front coolers, however, is that the cooler consumes several times more energy than a glass door merchandiser of the same size due to the lack of a door or other type of insulated front space. The increased sales revenue generally provided by an open front cooler thus may not cover or justify the increased energy cost.

There is thus a desire therefore for an improved open front cooler or other type of merchandiser that promotes impulse purchases and easy accessibility like an open front cooler but with the reduced energy costs of a glass door merchandiser and the like.

SUMMARY OF THE INVENTION

The present application and the resultant patent thus provide a merchandiser. The merchandiser may include an ambient compartment with at least one ambient product therein, a temperature controlled compartment with at least one temperature controlled product therein, and a rotary internal transport system within the temperature controlled compartment so as to dispense a temperature controlled product in response to an ambient product being placed therein, The present application and the resultant patent further provide a method of dispensing a number of temperature controlled products. The method may include the steps of providing a number of ambient products and a number of temperature controlled products, inserting a selected ambient product into an input port, identifying the selected ambient product, maneuvering a storage wheel with a temperature controlled product corresponding to the selected ambient product, pushing the temperature controlled product into a vending system, and vending the temperature controlled product in a vending port.

The present application and the resultant patent further provide a merchandiser. The merchandiser may include an ambient compartment with at least one ambient product therein and a temperature controlled compartment with at least one temperature controlled product therein. The temperature controlled compartment may include an input system, an input wheel, one or more storage wheels, one or more pusher systems, and a vending system.

These and other features and improvements of the present application and the resultant patent will become apparent to one of ordinary skill in the art upon review of the following detailed description when taken in conjunction with the several drawings and the appended claims.

BRIEF DESCRIPTION OF DRAWINGS

FIG. 16 is a further perspective view of the input system of FIG. 14.

FIG. 17 is a partial perspective view of the input system and an input wheel of the rotary internal transport system of FIG. 12.

DETAILED DESCRIPTION

Figure 1:
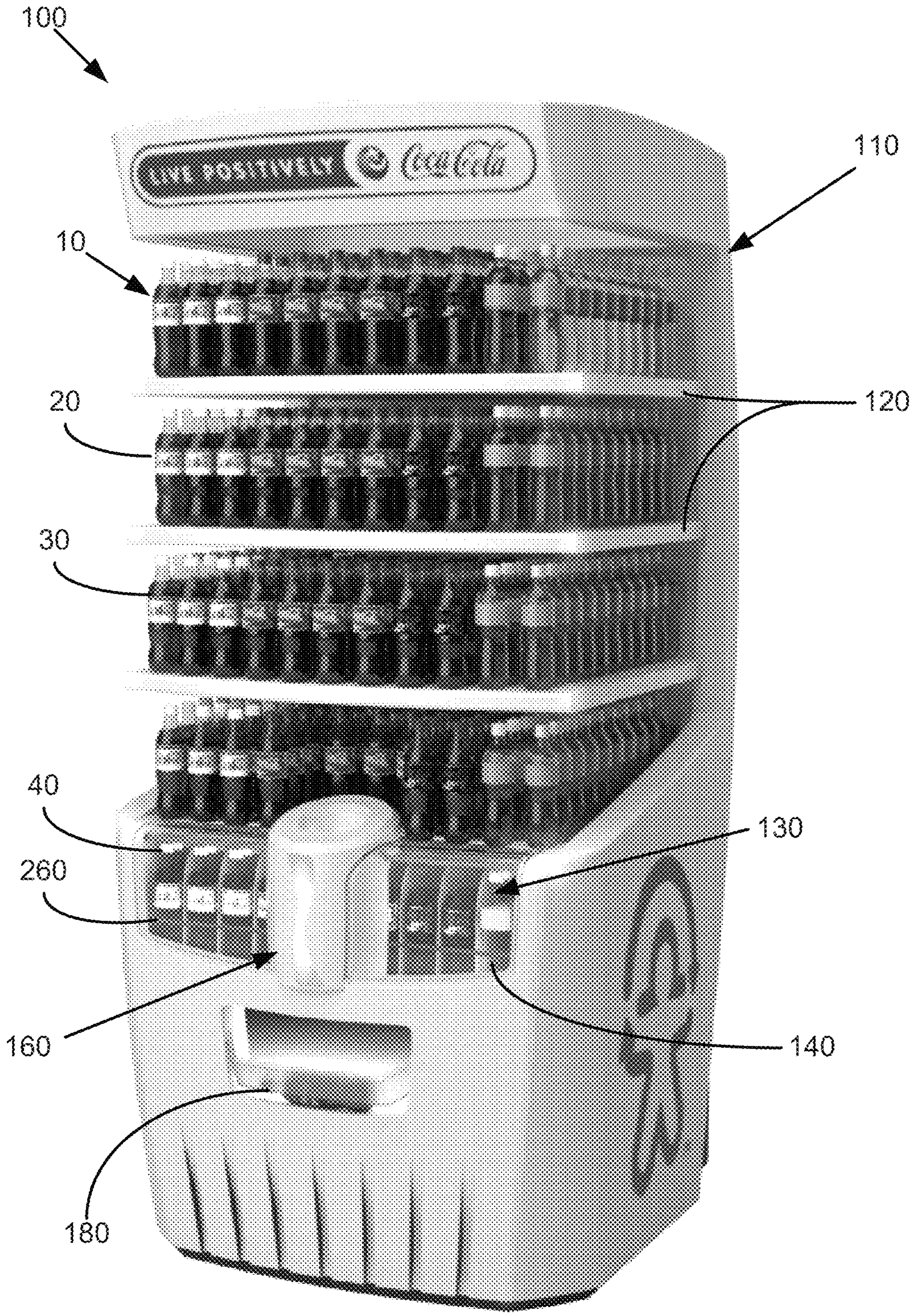
FIG. 1 is a perspective view of an example of a merchandiser as is described herein.

The present application concerns the offer for sale or other use of any number of products 10. Although the products 10 are shown, by way of example only, in the form of bottles 20, is understood that the products 10 may include any type or size of container including, but not limited to, bottles, cans, pouches, boxes, wrapped items, and/or any type of rigid or flexible packaging. The products 10 may include beverages, food items, non-food items, consumer products, and/or any type of product 10 that may be positioned on a shelf and/or that may be vended. The scope of this application is in no way limited by the nature of the products 10 intended to be used herein. Similarly, while one use herein is for a chilled product 10, it will be understood that the products 10 herein may be at ambient, refrigerated, frozen, heated or at any desired temperature or state.

As will be described in more detail below, the products 10 herein may take the form of ambient products 30 and temperature controlled products 40. The ambient products 30 and the temperature controlled products 40 may or may not be the same product 10. Other product variations may be used herein.

Figure 2:
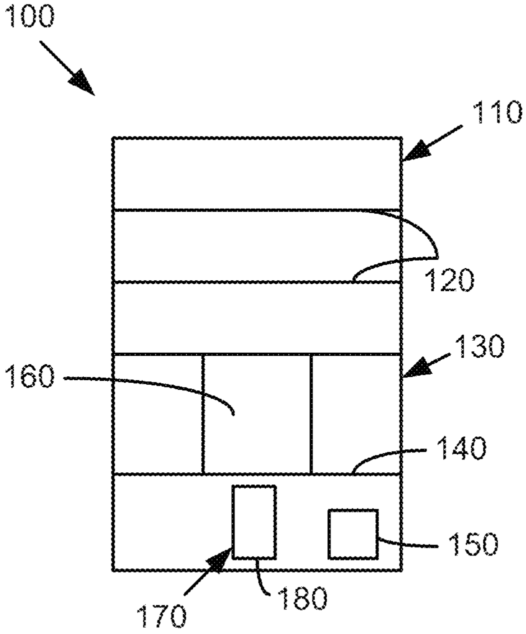
FIG. 2 is schematic view of the merchandiser of FIG. 1.

FIGS. 1 and 2 show a merchandiser 100 as may be described herein. The merchandiser 100 may include one or more open or ambient compartments 110. Each ambient compartment 110 may include a number of open or ambient compartment shelves 120. Any number of ambient compartment shelves 120 may be used. Likewise, the ambient compartment shelves 120 may have any desired shape or size. Any number of the products 10 may be placed on the ambient compartment shelves 120. Although flat shelves are shown herein, the ambient compartment shelves 120 may be any structure that may support the products 10 such as angled shelves, gravity feed shelves, neck tracker tubes, product chutes, and the like. Likewise, vertical columns and conventional vending columns also may be used. At least the front of the ambient compartment 110 may allow unimpeded access to the products 10 on the ambient compartment shelves 120.

The ambient compartment 110 described herein generally at an ambient temperature and as such is not temperature controlled. Likewise, the products 10 therein may be at an ambient temperature. Part or the entire ambient compartment 110, however, could be heated, cooled, or otherwise temperature controlled as desired at least temporarily.

The merchandiser 100 also may include a temperature controlled compartment 130. The temperature controlled compartment 130 may be enclosed and/or insulated. The temperature controlled compartment 130 may have any number of temperature controlled shelves 140. The temperature controlled shelves 140 may have any desired shape, size, or orientation. Although only one temperature controlled shelf 140 is shown, any number of shelves 140 may be used. Although flat shelves are shown herein, the temperature controlled shelves 140 may be any structure that may support the products 10 such as angled shelves, gravity feed shelves, neck tracker tubes, product chutes, and the like. Likewise, vertical columns and conventional vending columns also may be used. Although the temperature controlled compartment 130 is shown in FIGS. 1 and 2 as integral with the merchandiser 100, it is to be understood that the temperature controlled compartment 130 may operate as a stand-alone unit, allowing ambient products 10 such as on traditional store shelves or containers to be used in combination with the temperature controlled compartment 130 as described herein.

The number of ambient compartment shelves 120 is generally greater than the number of temperature controlled shelves 140, but not necessarily so. The temperature controlled compartment 130 may be at any desired temperature from freezing, chilled, ambient, warm, or hot. The temperature controlled compartment 1130 may be in communication with a conventional heating/cooling module 150 and the like. Multiple temperature controlled compartments 130 with multiple temperatures also may be used herein. Although the temperature controlled compartment 130 is shown as positioned beneath the ambient compartment 110, the temperature controlled compartment 130 may be positioned on top, on the side, or, as explained below, apart from the ambient compartment 110.

The temperature controlled compartment 130 and/or the ambient compartment 110 may include a scanner or other type of identification module 160. The scanner module 160 may include a barcode scanner, an RFID tag reader, photoelectric cells, and/or any type of device that may read indicia on the product 10, identify the shape of the product 10, or otherwise identify the product 10. Alternatively, the identity of the product 10 may be entered or otherwise indicated by a consumer such as by pressing a product selection button and the like. Other types of selection means may be used herein. Although the scanner module 160 is shown as being positioned adjacent to the temperature controlled compartment 130, the scanner module 160 may be positioned in any convenient location. The scanner module 160 also may eject a product 10 that is not intended to be used with the merchandiser 100 as a whole.

The merchandiser 100 also may include a vending module 170. The vending module 170 may include a vending port 180. Although the vending port 180 is shown as being positioned adjacent to the temperature controlled compartment 130 and the scanner module 160, the vending module 170 may be positioned in any convenient location.

The vending module 170 may include an internal transport system 190. The internal transport system 190 may transport the products 10 from the scanner module 160 or other location to a location within the temperature controlled compartment 130 or otherwise. The internal transport system 190 also may transport the products 10 to the vending port 180 or otherwise as desired. Any number of internal transport system configurations may be used herein.

Figure 3:
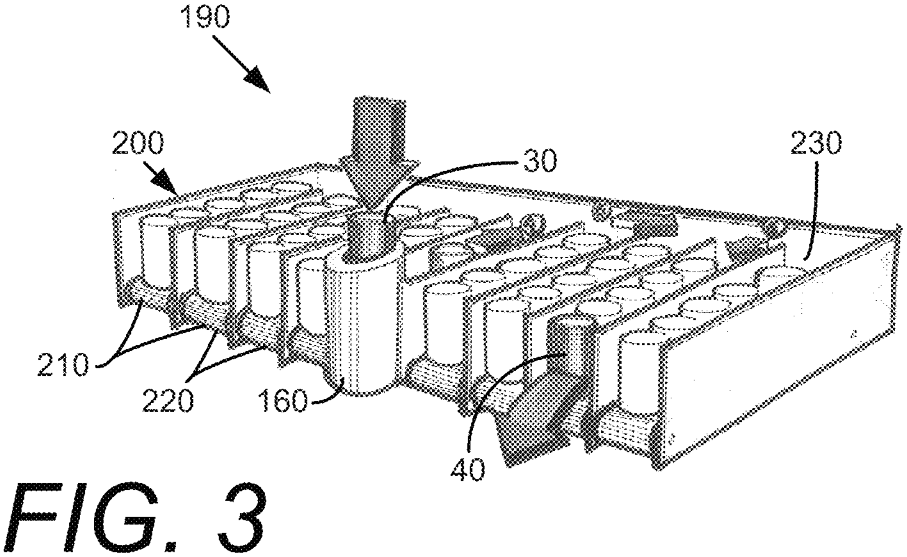
FIG. 3 is a perspective view of an internal transport system as may be used with the merchandiser of FIG. 1.

FIG. 3 shows an embodiment of the internal transport system 190 as a conveyor belt system 200. The temperature controlled shelves 140 may be divided into a number of columns 210 with the products 10 thereon. Each or some of the columns 210 may have a column conveyor belt 220 positioned thereabout or a similar type of product drive means. The column conveyor belts 220 also may be in communication with a transverse conveyor belt 230 or a similar type of product drive means. In this example, the transverse conveyor belt 230 may be positioned at the rear of the temperature controlled compartment 130. Other vending configurations may be used herein.

In use, one of the column conveyor belts 220 may deliver a selected ambient product 30 from the scanner module 160 and deliver it to the transverse belt 230 or otherwise. The transverse belt 230 then may deliver the product 30 to one of the columns 210 so as to be temperature controlled. Likewise, the column belt 220 may dispense the corresponding temperature controlled product 40 to be vended to the vending port 180 or otherwise via gravity or otherwise. Other vending procedures may be used herein.

Figure 4:
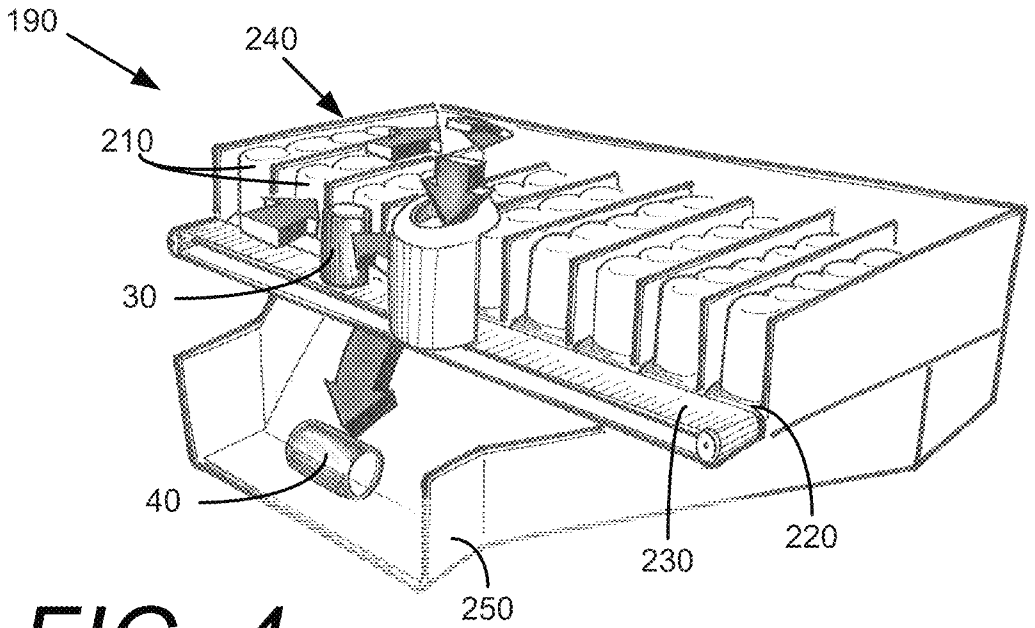
FIG. 4 is a perspective view of an alternative embodiment of the internal transport system as may be used with the merchandiser of FIG. 1.

FIG. 4 shows a further embodiment of the internal transport system as a conveyor belt and chute system 240. The conveyor belt and chute system 240 also may include a number of columns 210 with column conveyor belts 220 thereon as well as a transverse conveyor belt 230 or a similar type of drive means. In this case, the transverse conveyor belt 230 may he positioned about the scanner module 160.

Other positions may be used herein. A chute 250 may be positioned beneath the shelf 140 and in communication with the vending port 180. Other vending configurations may be used herein.

In use, the transverse conveyor belt 230 may remove the selected ambient product 30 from the scanner module 160 and deliver it to the appropriate column 210 to be temperature controlled. The column conveyor belt 220 then may position the ambient product 30 onto the column 210 while also dispensing the corresponding temperature controlled product 40 into the chute 250 via gravity or otherwise. Alternatively, a positioning bar 260 may push the selected ambient product 30 into the appropriate column 210. Other vending procedures may be used herein.

Figure 5:
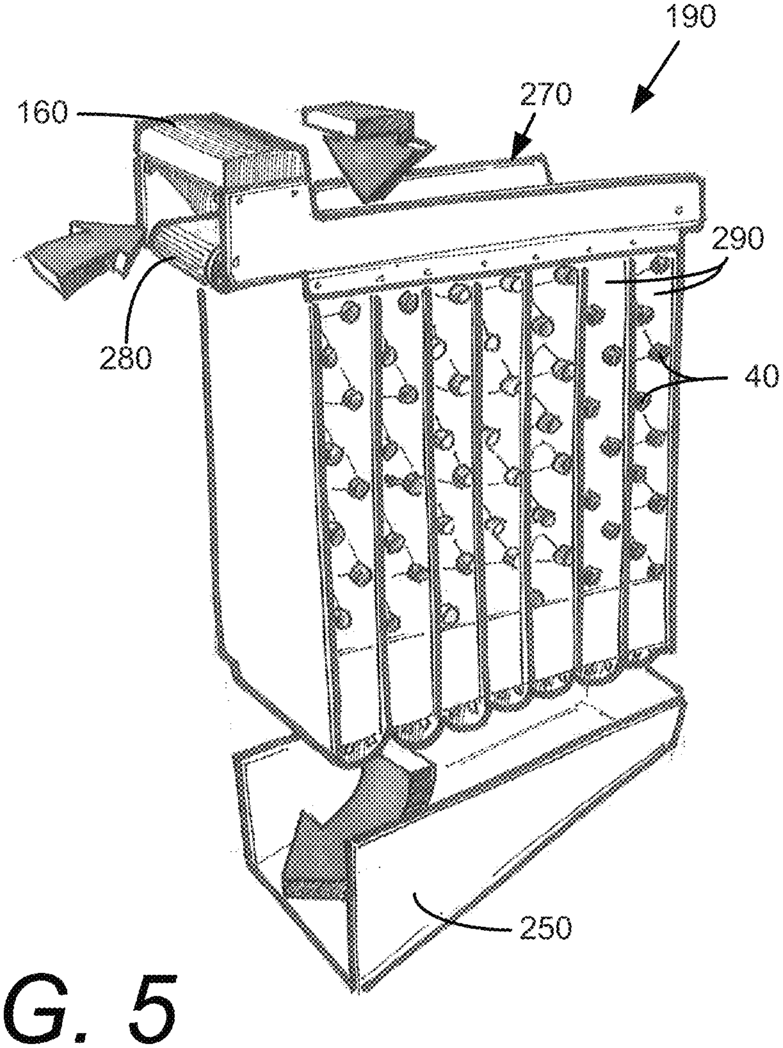
FIG. 5 is a perspective view of a further alternative embodiment of the internal transport system as may be used with the merchandiser of FIG. 1.

FIG. 5 shows a further embodiment of the internal transport system as a vertical product system 270. The vertical product system 270 may include the scanner module 160 positioned on top of the temperature controlled compartment 130. The vertical product system 270 may include a top conveyor 280 while the temperature controlled compartment 130 may include a number of vertical chutes 290 in communication therewith as the temperature controlled shelves 140. Other vending configurations may be used herein.

In use, a selected ambient product 30 may be read by the scanner module 160 and then travel along the top conveyor 280 into one of the chutes 290. Likewise, the corresponding temperature controlled product 40 may drop out of the chutes 290 and into the vending port 180 under gravity or otherwise. Alternatively, a number of the angled shelves 140 may be used such that the top conveyor 280 may deliver the ambient product 30 to the back of one of the shelves 140 and the temperature controlled product 40 may exit from the front of one of the shelves 140. A vertical transport system also may be used herein. Other vending procedures may be used herein.

Figure 6:
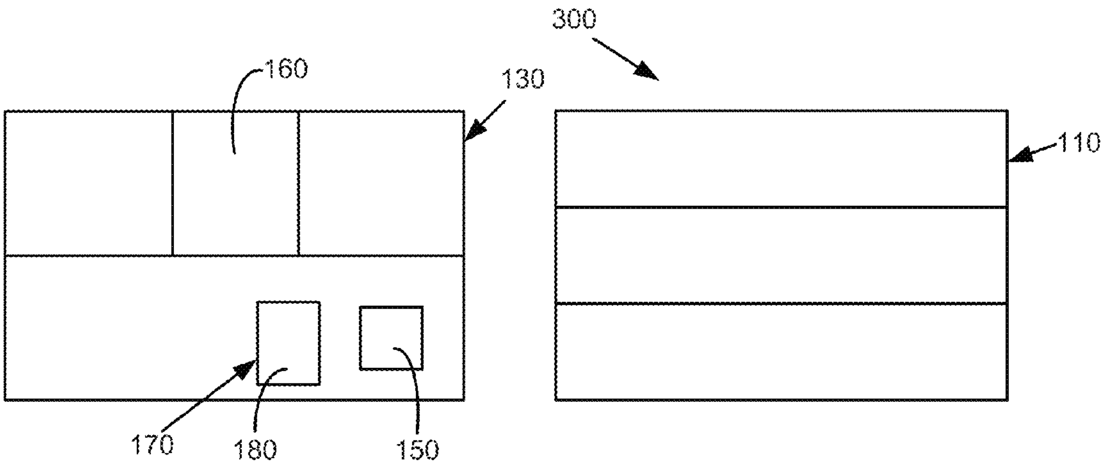
FIG. 6 is a schematic view of an alternative embodiment of a merchandiser as may be described herein.
Figure 7:
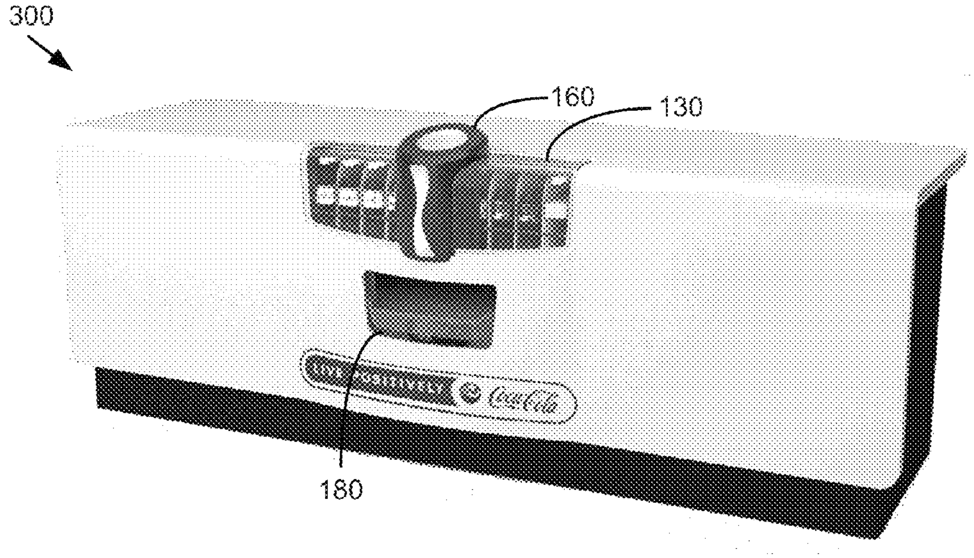
FIG. 7 is a perspective view of an example of the merchandiser of FIG. 6.

FIGS. 6 and 7 show a further embodiment of a merchandiser 300. In this embodiment, the merchandise 300 may be modular with the ambient compartment 110 separate from the temperature controlled compartment 130. Although the scanner module 160 is shown as being part of the temperature controlled compartment 130, the scanner module 160 also may be positioned at any convenient location. Likewise, the heating/cooling module 150 is shown as being positioned within the temperature control compartment 130 but also could be positioned elsewhere as may be desired. Moreover, only the temperature controlled compartment 130 may be used. Other configurations may be used herein.

Figure 8:
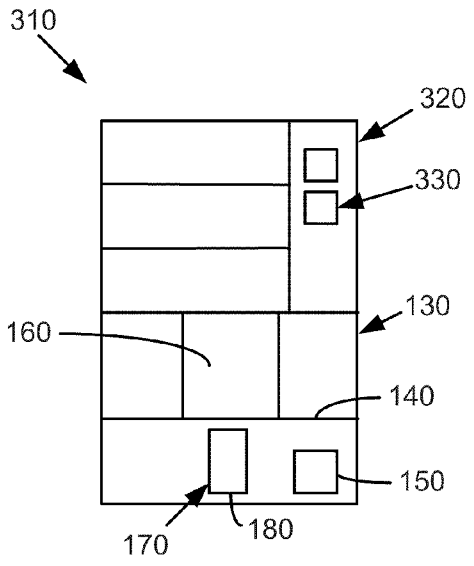
FIG. 8 is a schematic view of a further alternative embodiment of a merchandiser as may be described herein.
Figure 9:
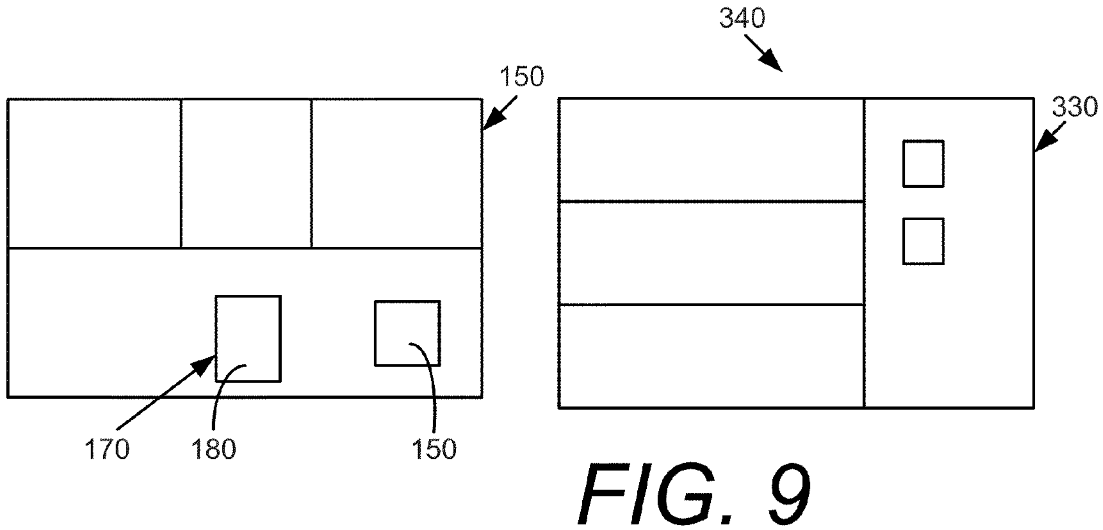
FIG. 9 is a schematic view of a further alternative embodiment of a merchandiser as may be described herein.

FIG. 8 shows a further embodiment of a merchandiser 310. The merchandiser 310 may include a vending compartment 320 instead of the ambient compartment 110. The vending compartment 320 may include conventional vending controls 330 such as selection panels and payment devices. A consumer may make a product selection at the vending compartment 320. The vending compartment 320 may deliver the ambient product 30 to the temperature controlled compartment 130 and/or the scanner module 160. The corresponding temperature controlled product 40 then may be vended as above. The vending compartment 320 may be at ambient or any desired temperature. As is shown in FIG. 9, a merchandiser 340 also may be modular with the vending compartment 320 separate from the temperature controlled compartment 130. Other configurations may be used herein.

In an alternative embodiment, the merchandiser 310 may include an ambient glass front compartment that resembles a glass front cooler, but operates at ambient temperature. The glass front portion of the merchandiser 310 may sit integrally with or merely proximate to the temperature controlled compartment 130, and may be accessed in response to a payment operation that allows the door to be opened via a payment module in response to completing a valid transaction.

Figure 10:
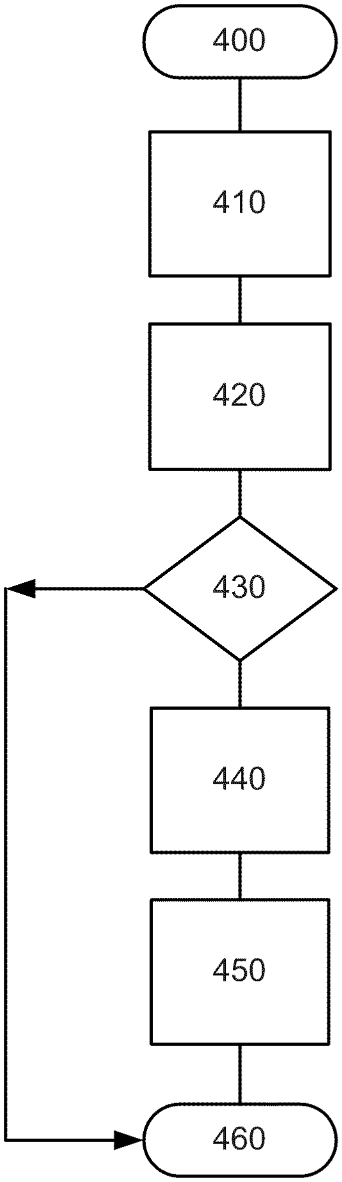
FIG. 10 is a flowchart showing a number of steps in the dispensing of a product in the merchandiser described herein.

FIG. 10 shows a flowchart of several of the process steps that may be used herein in providing the product 110 to a consumer. The process starts at step 400 in which the consumer approaches the merchandiser 100. At step 410, the consumer may remove one of the products 10 from one of the ambient compartment shelves 120 of the ambient compartment 110, i.e., the selected ambient product 30. At step 420, the consumer may place the selected ambient product 30 in the scanner module 160. At step 430, the scanner module 160 identifies the product 30 therein. If the product 30 is identified, the process continues to step 440. If not, the process is terminated. At step 440, the internal transport system 190 may dispense a temperature controlled product 40 to the vending port 180 that is temperature controlled and corresponds to the selected ambient product 30. At step 450, the internal transport system 190 may position the ambient product 30 into the appropriate column 210 in the temperature controlled compartment 130 so as to be temperature controlled and for later use as the temperature controlled product 40. The method ends at step 460. Other method steps may be used herein.

The merchandiser 100 may provide for at least a degree of product "purity", i.e., only a single brand, series of brands, or brands of a specific company may be recognized by the scanner module 160 such that any other products 10 or brands may be rejected. This may he accomplished, for example, by the scanner module 160 being adapted to recognize only predetermined products, rejecting all others by default. Further, a percentage of the products 10 therein may be of one brand or one company and a certain percentage may be of another. To enforce a permitted "purity" percentage, the scanner module 160 further may include a counter-mechanism to keep inventory of different products 10 on hand in the temperature controlled compartment 130 and reject certain products 10 if their proportion in the temperature controlled compartment 130 exceeds a predetermined limit. Any percentage may be used herein. A balance of products 10 likewise may or may not be found in the ambient compartment 110 and the temperature controlled compartment 130.

The use of the merchandiser 100 thus provides the impulse purchases often found with an open front cooler given the use of the ambient compartment 110. The merchandiser 100, however, also provides the energy efficiency (and potentially even great efficiency) typically found with a glass door merchandiser given the use of the relatively smaller temperature controlled compartment 130 and the general lack of temperature controls about the ambient compartment 110.

Moreover, the positioning of the scanner module 160 directly on top of the vending port 180 may give the consumer an enjoyable "instant chill" experience, i.e., simulating that the ambient product 30 was instantaneously cooled to its desired temperature as the temperature controlled product 140. The merchandiser 100 thus provides impulse purchases, energy efficiency, and an improved and enjoyable consumer experience.

Figure 11:
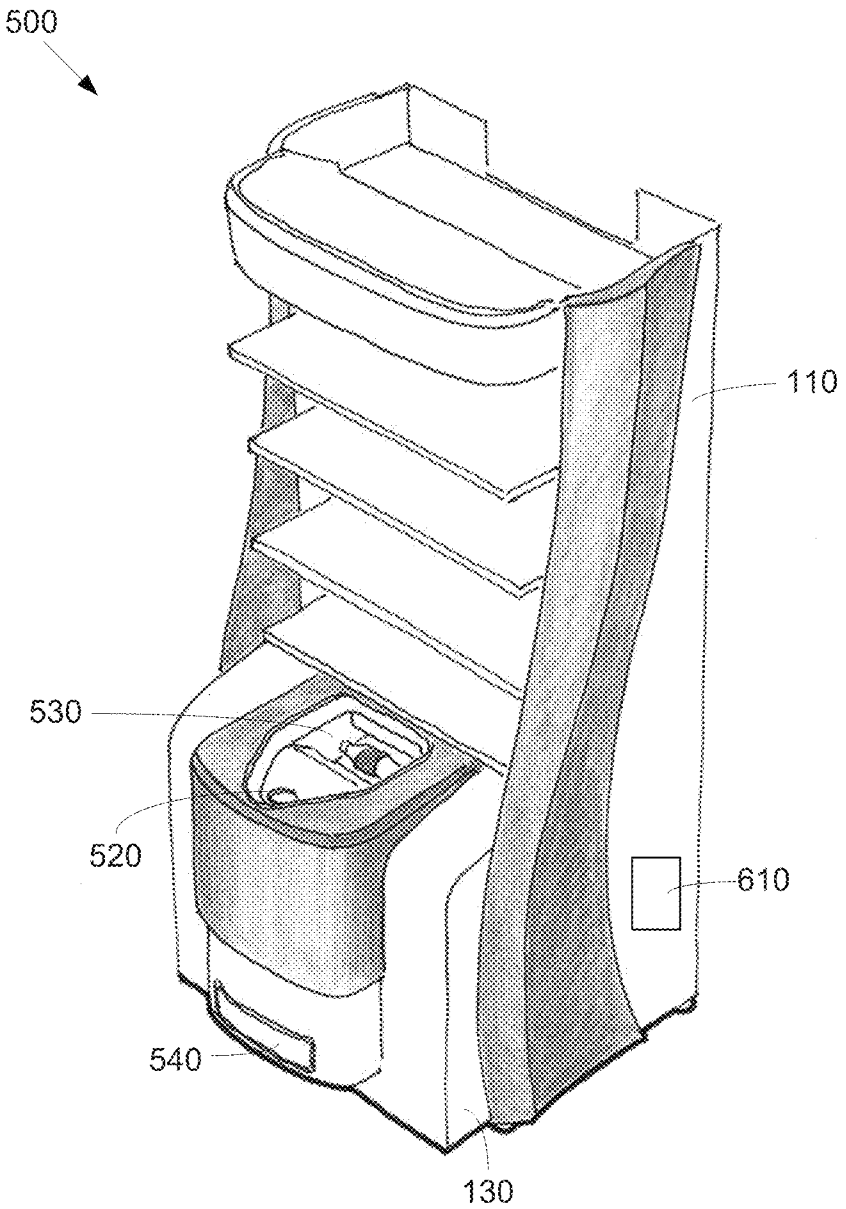
FIG. 11 is a perspective view of a further embodiment of a merchandiser as may be described herein.

FIG. 11 shows a further embodiment of a merchandiser 500 as may be described herein. Similar to the merchandisers described above, the merchandiser 500 may include a number of ambient products positioned within the open or ambient compartment 110 and a number of temperature controlled products 40 in the temperature controlled compartment 130. The merchandiser 500 herein includes a rotary internal transport system 510. Generally described, the rotary internal transport system 510 includes an input port 520, a vending port 530, and a reject port 540 available to the consumer about an exterior thereof. Other components and other configurations may be used herein.

Figure 12:
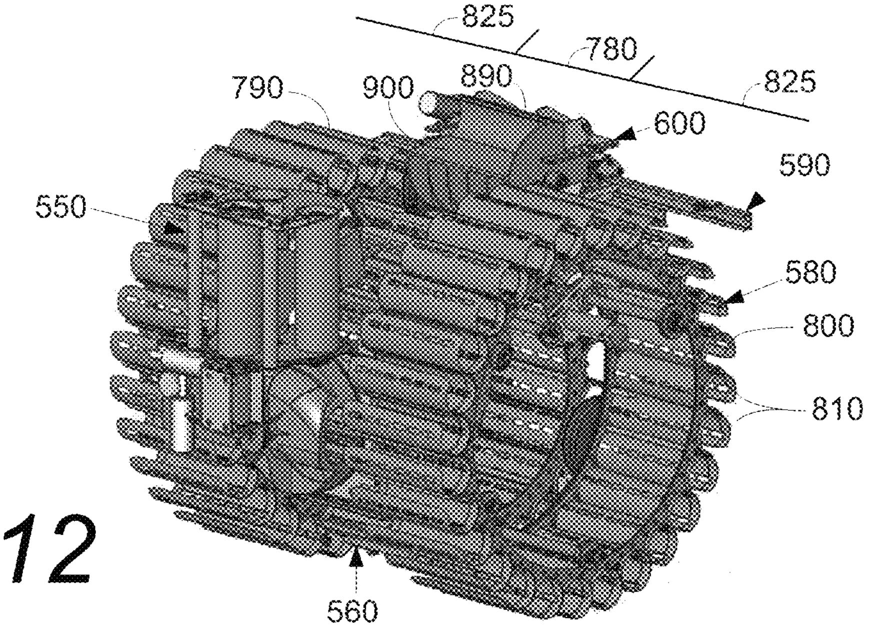
FIG. 12 is a perspective view of an alternative embodiment of a rotary internal transport system as may be used with the merchandiser of FIG. 11.
Figure 13:
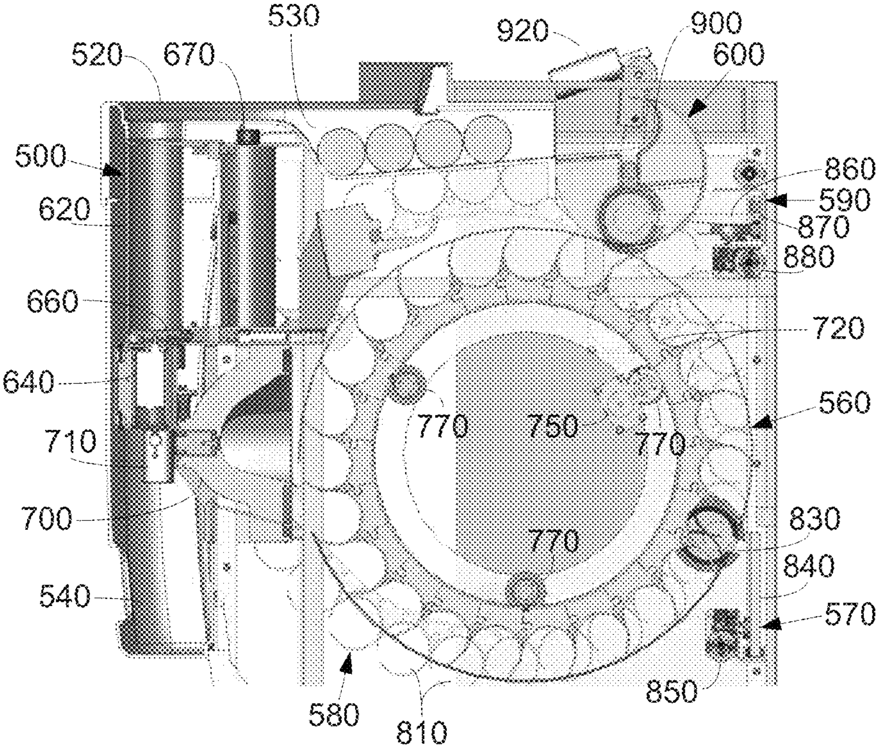
FIG. 13 is a partial side view of the rotary internal transport system of FIG. 12.

FIGS. 12 and 13 show an example of the rotary internal transport system 510. The rotary internal transport system 510 is positioned within the temperature controlled compartment 130. Generally described, the rotary intake transport system 510 may include an input system 550, an input wheel 560, an input pusher system 570, one or more storage wheels, an output pusher system 590, a vending system 600, and a programmable controller 610. The programmable controller 610 may be of conventional design such that programming the various steps described below may be within the ability of one skilled in the art. As will be described in more detail below, all of these components need not necessarily be used together. Other components and other configurations may be used herein.

Figure 14:
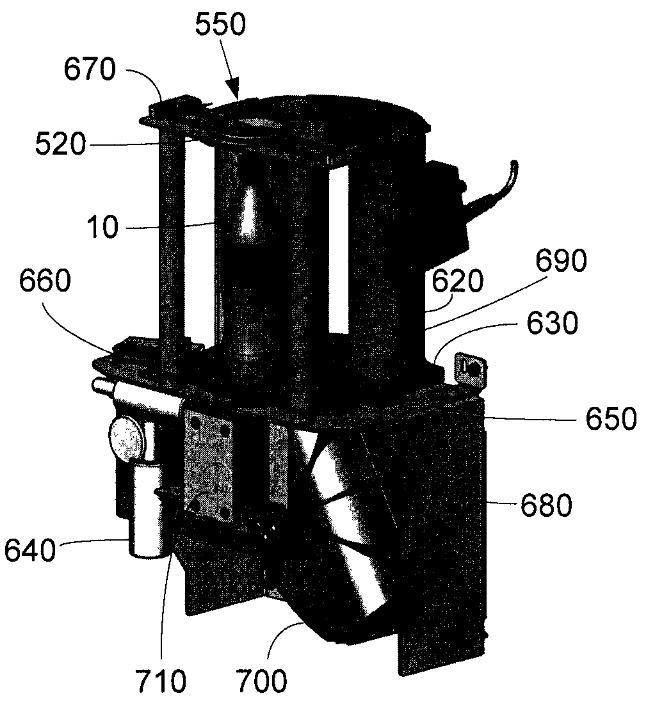
FIG. 14 is a perspective view of an input system of the rotary internal transport system of FIG. 12.
Figure 15:
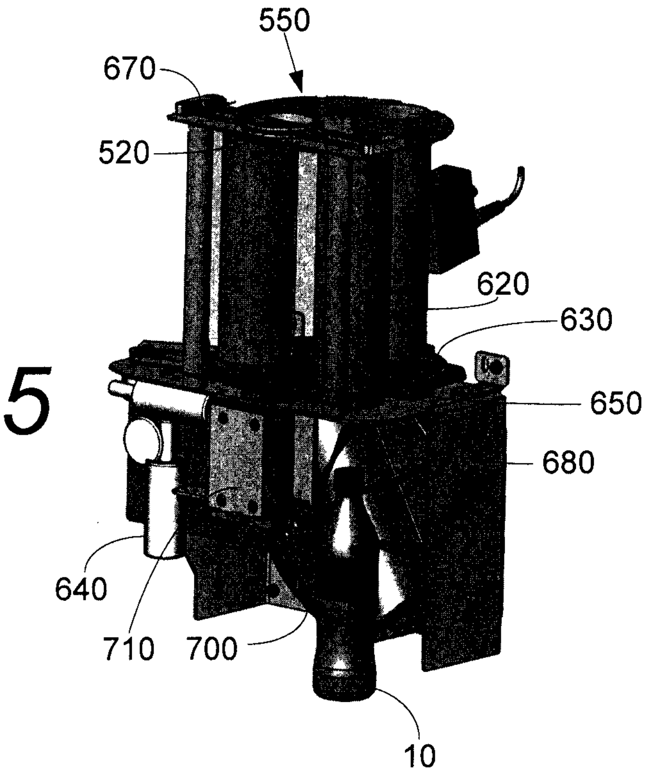
FIG. 15 is a further perspective view of the input system of FIG. 14.

Examples of the input system 550 are shown in FIGS. 14-16. The input system 550 may include a number of input tubes 620 positioned on a rotating plate 630. Any number of input tubes 620 may be used so as to accommodate a number of products 10 being placed into the merchandiser 500 in quick order. The input tubes 620 may be sized to accommodate a number of differing products 10 with differing dimensions and configurations. Each of the input tubes 620 may rotate with the rotating plate 630 into position about the input port 520 and elsewhere. The rotating plate 630 may be motor driven via a plate motor 640. In this example, the rotating plate 630 may be pulley driven although any type of drive means may be used herein. The plate motor 640 may be in communications with the controller 610. The position of the rotating plate 630 may be determined by a number of positioned sensors 650.

The input system 550 also may include a weight module 660 and an identification module 670. The weight module 660 may be positioned about the rotating plate 630 so as to weight the product 10 as it is positioned within one or the input tubes 620. The weight module 660 may be any type of electrical weight scale and the like. The weight module 660 may be in communication with the controller 610 so as to aid in identifying the product 10 therein. Likewise, the identification module 670 may be positioned about the input port 520 and the input tube 620. The identification module 670 may include a barcode scanner, an RFID tag reader, photoelectric cells, and/or any type of device that may read indicia on the product 10, identify the shape of the product 10, or otherwise identify the product. The combination of the weight module 660 and the identification module 670 may accurately identify the product 10 for the controller 610.

Based upon the identification of the product 10, the rotating plate 630 may rotate to a reject aperture 680 or to a swivel aperture 690. As is shown in FIG. 15, the reject aperture 680 permits the product 10 to fall towards the reject port 540 and out of the merchandiser 500 if an authorized product 10 is not identified. As is shown in FIG. 16, a properly identified product 10 may drop through the swivel aperture 690 into a swivel assembly 700.

The swivel assembly 700 may be substantially cup-like in shape. Similar shapes may be used herein. The swivel assembly 700 may be motor driven via a swivel motor 710. The swivel motor 710 also may be in communication with the controller 610. The swivel assembly 700 rotates so as to turn the incoming product 10 from a vertical position into a horizontal position for loading into the input wheel 560. Other components and other configurations may be used herein.

As is shown in FIG. 17, the input wheel 560 may include a number of incoming wheel support cups 720. Although twenty-three (23) incoming wheel support cups 720 are shown, any number may be used herein. The incoming wheel support cups 720 may be largely U-shaped or C-shaped so as to support a product 10 therein during rotation while allowing horizontal movement as will be described in more detail below. Each incoming wheel support cup 720 may have a number of cup apertures 730 therein. The cup apertures 730 allow for the drainage of condensation and the like. The support cups 720 may be positioned on a pair of support wheels 740 for rotation therewith. The support wheels 740 may be motor driven via an input wheel motor 750. The input wheel motor 750 may drive the support wheels 740 via a number of transmission rods 760 and gears 770. Other types of drive means may be used herein. The input wheel motor 750 may be in communication with the controller 610. Other components and other configurations may be used herein.

The input wheel 560 may be positioned within a quick chill section 780. The quick chill section 780 may be in communication with the heating/cooling module 150 as described above. The quick chill section 780 may be maintained at about −23 degrees Celsius or so as to chill quickly the products 10 therein in less than a minute or so. Other temperatures and other configurations may be used herein.

Figure 18:
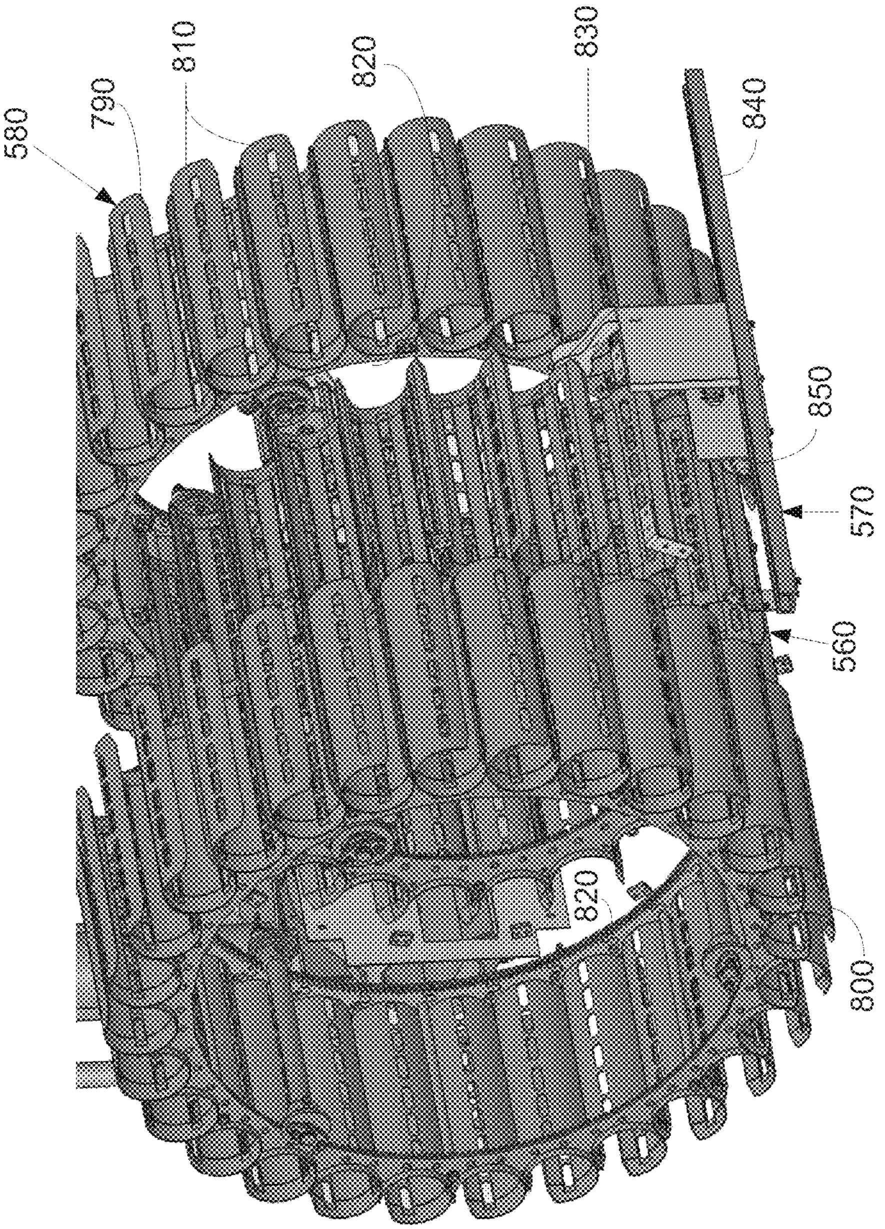
FIG. 18 is a partial perspective view of a number of storage wheels and an input pusher system positioned about the input wheel of the rotary internal transport system of FIG. 12.

FIG. 18 shows a first storage wheel 790 and a second storage wheel 800 of the one or more storage wheels 580 positioned about the input wheel 560. The storage wheels 790, 800 also include a number of storage wheel support cups 810. The storage wheel support cups 810 also may have a largely U-shape or a C-shape, but may be more tightly closed than the input wheel storage cups 720 given the complete rotation of the storage wheels 790, 800. The storage wheel support cups 810 also may be positioned on a number of storage support wheels 820 for rotation therewith. The storage support wheels 820 likewise may be driven by the input wheel motor via the drive rods 760 and the gears 770. A separate drive mechanisms in communication with the controller 610 also may be used herein. Other components and other configurations may be used herein.

The one or more storage wheels 580 may be positioned within one or more constant cool sections 825. The constant cool sections 825 may be in communication with the heating/cooling module 150 as described above. The constant cool sections 825 may be maintained at about zero (0) degrees Celsius or higher so as to maintain the products 10 therein in a chilled condition without risk of freezing. Other temperatures and other configurations may he used herein.

FIG. 18 also shows the input pusher system 570. The input pusher system may be positioned between the input wheel 560 and the first storage wheel 790 or the second storage wheel 800. The input pusher system 570 includes one or more input arms 830. The input arms 830 may be maneuvered horizontally along a track 840 via an input pusher motor 850. The input pusher motor 850 may he in communication with the controller 610. The input pusher system 570 thus may push a product 10 from the input wheel 560 into the first or the second storage wheels 790, 800 via the input arms 830. Other components and other configurations may be used herein.

Figure 19:
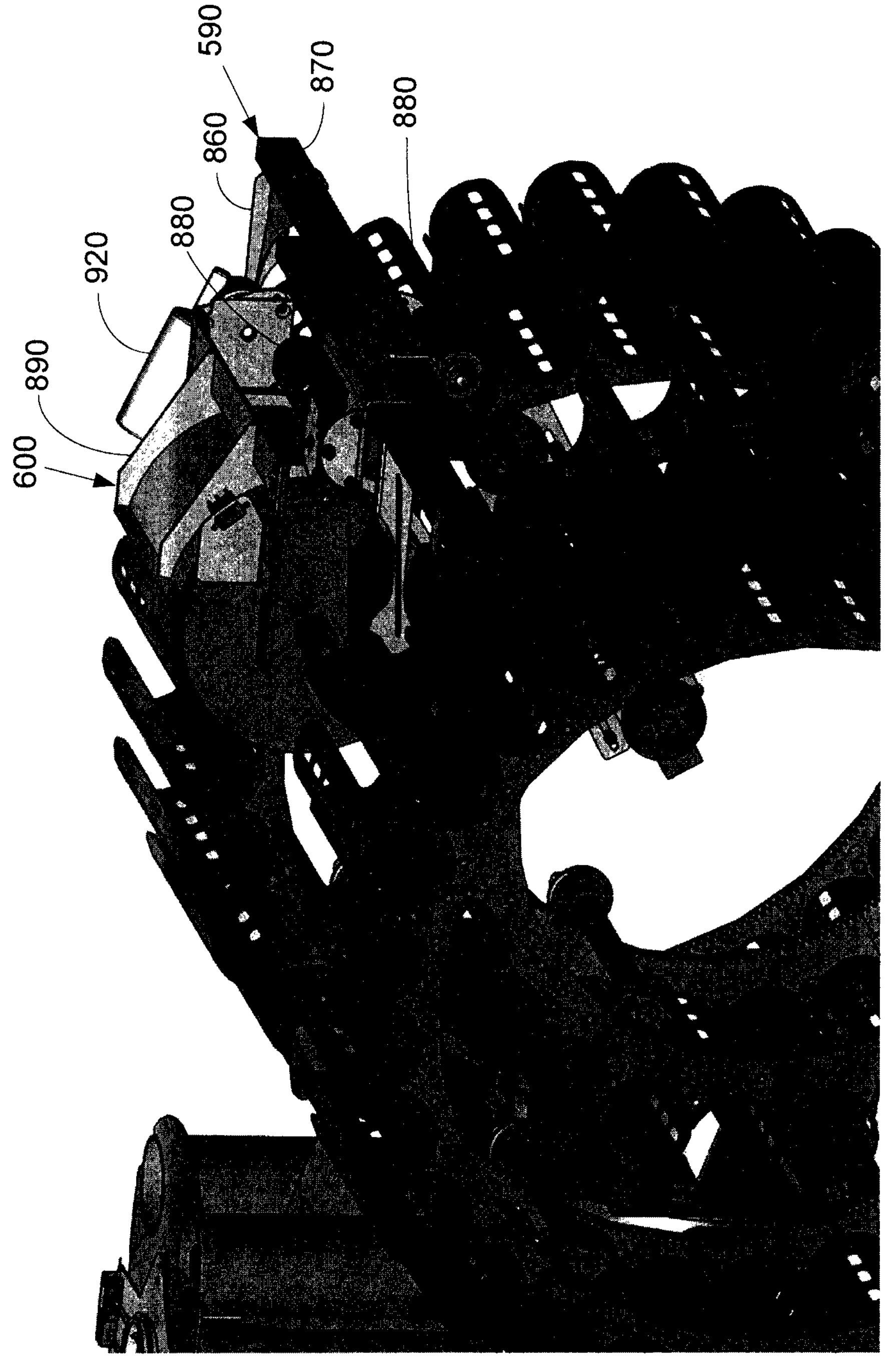
FIG. 19 is a partial perspective view of the storage wheels, an output pusher system, and a vending system of the rotary internal transport system of FIG. 12.

FIG. 19 shows the output pusher system 590 and the vending system 600. The output pusher system 590 also includes one or more output pusher arms 860 mounted on one or more output tracks 870. The output pusher arms 860 may be driven by one or more output pusher motors 880. The output pusher motor 880 may be in communication with the controller 610. The output pusher arm 860 pushes a product 10 from the first or the second storage wheel 790, 800 into the output system 600. Other components and other configurations may be used herein.

The vending system 600 may be positioned about the vending port 530. The vending system 600 may include a rotating dispensing wheel 890. The rotating dispensing wheel 890 may include a pair of opposed cups 900 positioned about a rod 910 for rotation therewith. The rotating dispensing wheel 890 may be motor driven by a dispensing motor 920. The dispensing motor 920 may he in communication with the controller 610. The product 10 may be pushed by the output pusher arm 860 of the output pusher system 590 into one of the opposed cups 900 of the rotating dispensing wheel 890. The rotating dispensing wheel 890 then may rotate via the dispensing motor 920 so as to dispense the product 10 therein into the vending port 530. Other components and other configurations ma be used herein.

In use, a number of different products 10 may be positioned about the ambient shelves 120 and within the temperature controlled compartment 130. The temperature controlled compartment 130 may include the quick chill section 780 and the one or more constant cool sections 825. Alternatively, the temperature controlled compartment 130 may be at a uniform temperature throughout in the manner of the constant cool sections 825 and the like.

A consumer thus may place one of the products 10 into the input port 520 of the merchandiser 500. The product 10 falls into the input tube 620 and may be weighted via the weight module 660 and/or identified via the identification module 670. The controller 610 then determines if the product 10 is authorized for use herein. If not, the product 10 may be rejected via the reject port 540. If authorized, the product 10 may be positioned within the swivel assembly 700. The swivel assembly 700 turns the product 10 from a largely vertical orientation to a largely horizontal orientation. Other types of transitioning means may be used therein. The product 10 then may roll into one of the input wheel support cups 720 of the input wheel 560. If the quick chill section 780 is used, the product 10 may be chilled as the input wheel 560 rotates from the swivel assembly 700 to the input pusher system 570 or, alternatively, directly to the vending system 600. The controller 610 may determine the length of time the product 10 may be within the quick chill section 780 without freezing and the final destination of the product 10 within the input wheel 560.

The input arm 830 of the input pusher system 570 then may push the product 10 from the input wheel support cup 720 into the appropriate storage wheel support cup 810 of the first or second storage wheel 790, 800. Both, one, or neither of the storage wheels 790, 800 may be used herein. The controller 610 may track the position of the particular product 10 within the storage wheels 580. The controller 610 likewise may identify the appropriate product 10 and its position within the one or more storage wheels 580 in determining which product 10 to dispense. The controller 610 thus rotates the storage wheels 790, 800 to the output pusher system 590 and the vending system 600. The one or more output arms 860 of the output system 600 may push the appropriate product 10 into the rotating dispensing wheel 890 of the vending system 600. The product 10 thus rolls into the vending port 530 where it is accessible by a consumer.

The merchandiser 500 thus provides many different products 10 to the consumer in a fast and efficient manner. Likewise, the use of the quick chill section 780 allows the merchandiser 500 to restock with chilled products 10 in a short amount of time. Any number of different products 10 may be positioned within the one or more storage wheels 580 so as to provide a wide variety to the consumer despite differing sizes and/or shapes.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A merchandiser for dispensing a number of products with a temperature controlled first product dispensed in response to an ambient second product being placed therein, comprising:

a temperature controlled compartment with a plurality of temperature controlled first products therein; and a rotary internal transport system comprising a storage wheel within the temperature controlled compartment;

wherein the rotary internal transport system comprises an input pusher system positioned between an input wheel and one or more storage wheels; and wherein the rotary internal transport system further comprises an output pusher system configured to push the temperature controlled first product from the storage wheel such that the rotary internal transport system dispenses the temperature controlled first product in response to the ambient second product being placed therein.

2. The merchandiser of claim 1, wherein the rotary internal transport system comprises an input port, a vending port, and a reject port accessible by a consumer.

3. The merchandiser of claim 1, wherein the rotary internal transport system comprises an input system.

4. The merchandiser of claim 3, wherein the input system comprises a weight module and/or an identification module.

5. The merchandiser of claim 3, wherein the input system comprises a swivel assembly so as to rotate an ambient second product from a vertical orientation to a horizontal orientation.

6. The merchandiser of claim 1, wherein the rotary internal transport system comprises an input wheel.

7. The merchandiser of claim 6, wherein the input wheel comprises a plurality of input wheel support cups.

8. The merchandiser of claim 6, wherein the temperature controlled compartment comprises a quick chill section and wherein the input wheel is positioned within the quick chill section.

9. The merchandiser of claim 1, wherein the storage wheel comprises a plurality of storage wheel support cups.

10. The merchandiser of claim 1, wherein the temperature controlled compartment comprises one or more constant cool sections and wherein the storage wheel is positioned within the one or more constant cool sections.

11. The merchandiser of claim 1, wherein the input pusher system comprises one or more input pusher arms.

12. The merchandiser of claim 1, wherein the output pusher system is positioned between one or more storage wheels and a vending system.

13. The merchandiser of claim 12, wherein the output pusher system comprises one or more output pusher arms.

14. The merchandiser of claim 1, wherein the rotary internal transport system comprises a vending system.

15. The merchandiser of claim 1, wherein the vending system comprises a rotary dispensing wheel.

16. The merchandiser of claim 1, further comprising an ambient compartment with a plurality of ambient second products therein.

17. A method of dispensing a number of temperature controlled products, comprising:

receiving a selected ambient product at an input port;

identifying the selected ambient product at the input port;

maneuvering a storage wheel with a temperature controlled product corresponding to the selected ambient product positioned therein;

pushing the temperature controlled product from the storage wheel with an output pusher system; and dispensing the temperature controlled product to a vending port.

18. The method of claim 17, further comprising the steps of pushing the selected ambient product into the storage wheel and chilling the ambient product.

19. The method of claim 17, wherein the selected ambient product is identified with one or more of a group consisting of:

a scanner;

an identification module;

a bar code scanner;

an RFID tag reader; a photoelectric cell;

an indicia reader;

a shape identifier;

a product selection; or a button.

* * * * *